United States Patent [19]

Kuboshima

[11] 4,099,189
[45] Jul. 4, 1978

[54] DATA-RECORD BACKGROUND-DEFINING APPARATUS FOR DATA-RECORDING PHOTOGRAPHIC CAMERA

[75] Inventor: Makoto Kuboshima, Sagamihara, Japan

[73] Assignee: Fuji Photo Film Co., Ltd., Minami Ashigara, Japan

[21] Appl. No.: 746,770

[22] Filed: Dec. 2, 1976

[30] Foreign Application Priority Data

Dec. 2, 1975 [JP] Japan .............................. 50-144408

[51] Int. Cl.$^2$ ............................................ G03B 17/24
[52] U.S. Cl. .................................................... 354/106
[58] Field of Search .............. 354/106, 107, 108, 109, 354/105; 250/320, 323; 352/90; 355/39, 40

[56] References Cited

U.S. PATENT DOCUMENTS

| 3,590,703 | 7/1971 | Ono ...................................... 354/106 |
| 3,683,764 | 8/1972 | Johnson ............................... 354/109 |
| 3,765,754 | 10/1973 | Winkler ................................. 352/90 |
| 3,928,863 | 12/1975 | Stewart et al. ....................... 354/109 |

FOREIGN PATENT DOCUMENTS 144,852   8/1950   Australia .............................. 354/109

*Primary Examiner*—Donald Griffin
*Attorney, Agent, or Firm*—Sughrue, Rothwell, Mion, Zinn and Macpeak

[57] ABSTRACT

Apparatus which ensures a background providing colored contrast to permit easy legibility of data items recorded on film material is always produced irrespective of the brightness or color of a photographed scene or of the portion thereof adjacent to the data recording area on the film material. In addition the whole area of film material may be made available for carrying the image of a scene when it is required to produce a photograph unaccompanied by data. The data projection system is independent of the taking lens system for the light reflected from the external scene and a movable blocking element moves only into and out of the path of the taking lens system.

10 Claims, 9 Drawing Figures

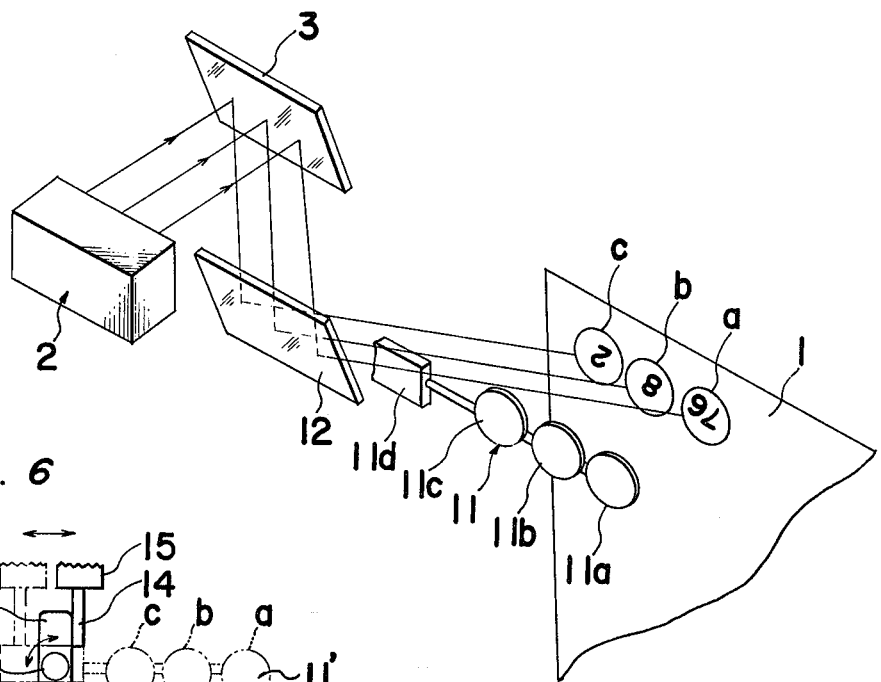
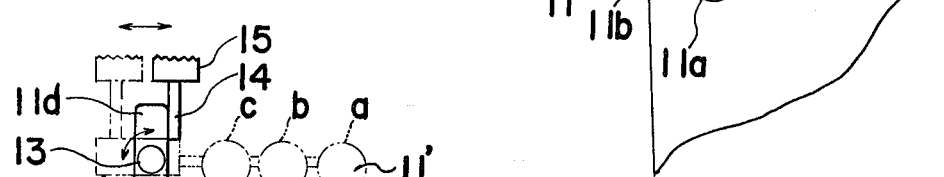
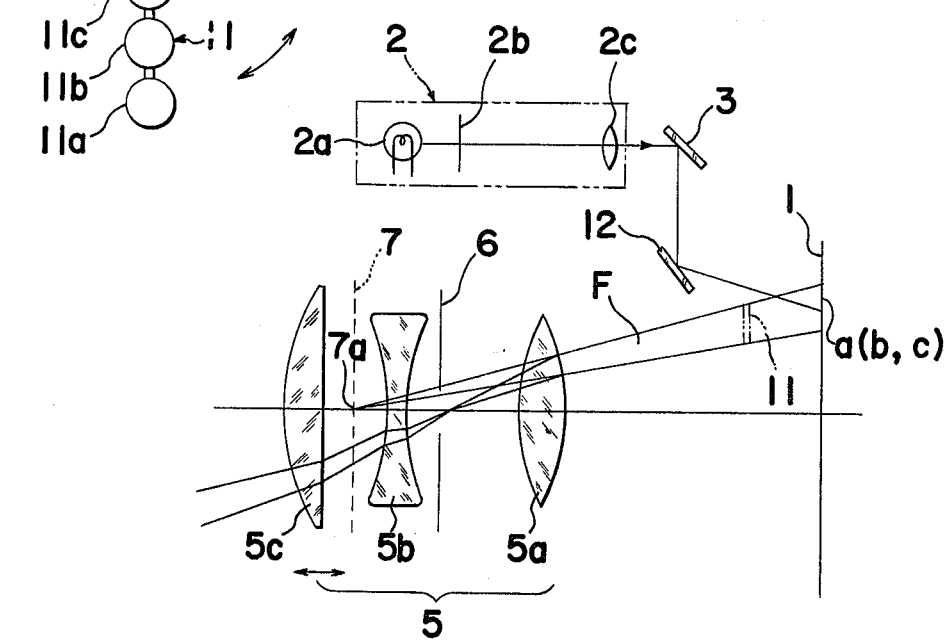

DATA-RECORD BACKGROUND-DEFINING APPARATUS FOR DATA-RECORDING PHOTOGRAPHIC CAMERA

The present invention relates to means for defining a background for data recorded on film material in a photographic camera wherein the data or similar data is recorded on film material simultaneously with taking of a photograph. More particularly the invention relates to a data-record background-defining means which permits clear recording of data on film material regardless of the brightness of a photographed scene.

In the so-called data-recording camera there is provided a data specification means, which comprises for example one or more rotatable wheel elements marked with different numbers, externally actuable data setting means by which the data specification means may be moved to bring specific numbers marked thereon to a data projection station, and a data projection system which is separate from the optical system of the camera for projection of image-wise light from an external scene onto film material and by which light carrying image of data items located at the data projection station is directed onto a particular portion of film material which is currently at an exposure station and is being exposed to produce a photograph of an external scene, this portion of the film material, which is referred to below as the data recording area, being generally near an edge portion of the exposed area of the film material. Data items which are to be recorded on film material may be illuminated by external light which is directed to the data projection station via a dormer window element or similar means, or, as is more common, by separate lighting means which is provided inside the camera and is momentarily actuated during actuation of the camera shutter. A separate lighting means for illumination of data items at the data projection station offers the advantage that, by provision of an externally actuable switch which controls the lighting means, it is made possible to produce photographs which are marked with or unmarked with data, as required.

When data recorded is marked in white on a completed photographic print, as is usually the case, there is the disadvantage that if the scene photographed is for example a snow landscape or other scene which is very bright, or if that portion of the photographed scene in which the data recording area lies is very bright, for example a white shirt or glass which is caught by a flashlight, it is very difficult or impossible to distinguish the items of recorded data from the background.

To overcome this problem, it has known to arrange the data projection system so the image of data items at the data projection station is directed onto a border portion of film material which does not carry the image of a photographed scene, data in this case usually being recorded in black. With this mode of recording data, however, it is not possible to effect direct production of a data record on a finished print in a single process, but it is necessary to go through the tedious process of comparing completed prints with the corresponding developed negatives, and then marking the prints with the relevant data. Alternatively, it has been known to permanently block off a certain area of film material to image-wise light from an external scene and employ this area exclusively for recording of data. In this case there is the disadvantage that when it is not required to record data there is left on a completed print a blank area which often spoils the composition of a photograph.

It is accordingly a principal object of the invention to provide a data-record background-defining means for a photographic camera which ensures that a suitable background making it possible to easily distinguish recorded data items is defined on a selected area of exposed film material regardless of the brightness of a photographed scene.

It is another object of the invention to provide a data-record background-defining means for a photographic camera which permits selective recording or non-recording of data on film material and which makes the entire area of film material available for carrying the image of a photographed scene when data is not recorded.

In accomplishing these and other objects there is provided according to the present invention an extremely simple construction in which a blocking element, which may constitute part of the data projection system or be separate therefrom and is opaque at least to light of certain wavelengths, may be positioned in the path of that portion of image-wise light exiting from the camera taking lens system which, if unhindered, would impinge on the data recording area of film material, or be moved to a position in which it no longer impedes light travelling along this path, whereby, if so required, the complete area of film material may be employed for carrying the image of a scene unaccompanied by a data record. The blocking element may be completely opaque, in which case there is formed in the data recording area a black background against which data items, suitably recorded in white, are clearly legible, even if the portion of the photographed scene surrounding the data recording area is very bright. Alternatively, the blocking element may opaque to light only of one colour. In this case, the blocking element suitably constitutes part of the data projection system and receives surface treatment to render reflective only of light of a colour which is complementary to the colour of the light to which the blocking element is transparent, whereby in this case also data items recorded in a particular colour may be clearly distinguished against a background of a contrasting colour.

A better understanding of the present invention may be had from the following full description of several preferred embodiments thereof when read in reference to the attached drawings, in which like numbers refer to like parts, and FIG. 1 is a schematic perspective view showing disposition of main elements of a data-record background-defining means according to a 1st embodiment of the invention;

FIG. 2 is a front to rear sectional view of the means of FIG. 1;

FIGS. 3(a) and 3(b) are side views of alternative blocking element constructions employable according to the invention;

FIG. 4 is a schematic perspective view of a data-record background-defining means according to a 2nd embodiment of the invention;

FIG. 5 is a side view of the means of FIG. 4;

FIG. 6 is a side view illustrating actuation of blocking elements employable in the means of FIG. 4;

Before proceeding with the description it is to be noted that terms such as forward, rear, upper, or lower are intended to be taken in reference to a normally upright camera positioned for taking a photograph.

Figure 1:
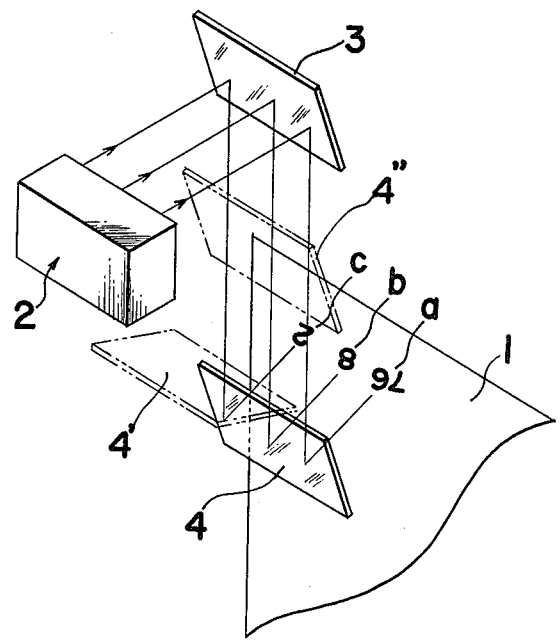
Figure 2:
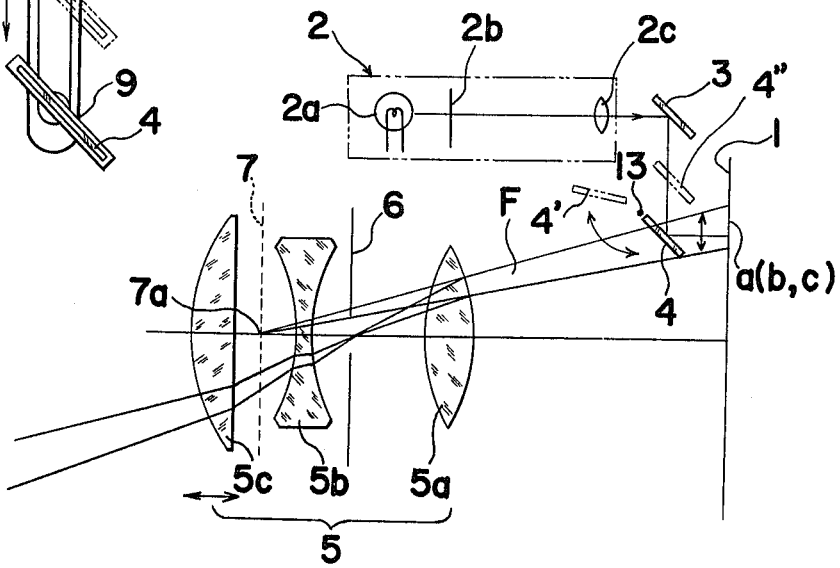

Referring initially to FIGS. 1 and 2, there is shown a data-recording means which is housed inside a camera main body portion, not shown, and comprises a data specification block 2 and a data projection system including a fixed full-reflection mirror 3 and a movable full-reflection mirror 4. The data specification block 2 and the fixed mirror 3 are located externally to the path of image-wise light rays which may be projected by the camera taking lens system 5 onto film material 1 which is brought in a known manner to an exposure station in the camera whereat the film material 1 is held in a manner such that the plane thereof is generally normal to the optical axis of the taking lens system 5.

The taking lens system 5 comprises a biconcave lens 5b provided between a rear lens 5a and a front lens 5c. Between the biconcave lens 5b and the rear lens 5a there is provided a diaphragm 6 for control of lens aperture. Also associated with the lens system 5 there is provided a shutter means not shown.

The data specification block 2 defines one or more rear openings and otherwise constitutes an opaque block, and has provided in a generally central portion thereof one or more data specification elements 2b, each of which carries a series of letters or numbers, representative of the data, for example, and is movable by externally actuable data setting means, not shown, to bring a particular data item carried thereby to a data projection station whereat it is in line with a light source 2a, which is provided in a forward portion of the data specification block 2 and is momentarily actuated during actuation of the camera shutter means in a known manner, and a focussing lens 2c which is provided in the rear portion of the data specification block 2 close to and in front-to-rear line with a rear opening defined in the block 2. The light source 2a and lens 2c also constitute a portion of the data projection system, and an item of data at the data projection station lies on the optical axis of the lens 2c, which is generally parallel to the optical axis of the taking lens system 5. Instead of movable data specification elements which remain inside the data specification block 2, there may of course be provided interchangeable insertion plates which carry different items of data and may be selectively and independently loaded into the block 2 and positioned at the data projection station therein.

The fixed mirror 3 is positioned rearward of the data specification block 2, intermediate the rear wall of the block 2 and the plane of the film material 1, and is inclined forwardly and at an angle of 45° to the optical axis of the data focussing lens 2c. Thus, when the light source 2a is actuated, the image of a data item at the data projection location is focussed by the lens 2c on the fixed mirror 3 and the mirror 3 directs the image downwards.

The movable mirror 4 may be held in a first position in which it is below and parallel to the fixed mirror 3 and extends across the light path F followed by light rays which have been reflected from an external scene and, after entering the taking system 5, extend over the area defined between the centre of the exit pupil of the taking lens system 5 and the edges of a data recording area which is suitably by a portion of the film material 1 which is near to the edge thereof, the mirror 4 being disposed at approximately right-angles to the line of travel of these light rays and the reflecting surface thereof being the rear surface thereof when the mirror 4 is in the first position. Thus, when a photograph is taken, and the light source 2a is actuated, the image of a data item directed downwardly by the fixed mirror 3 impinges on and is directed onto the data recording area of the film material 1 by the movable mirror 4, which simultaneously prevents impingement on the data recording area of light exiting from the taking lens system 5. In a completed print therefore the data recording area is defined by a completely black background against which data items are clearly visible, even if the rest of the photograph is very bright. In this embodiment of the invention data items are suitably as cut-out portions in the data specification element 2b, whereby data items are recorded in white on a completed print.

Figure 3A:
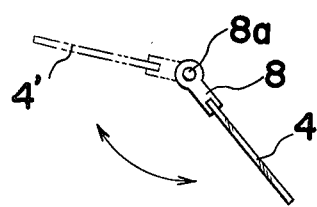
Figure 3B:
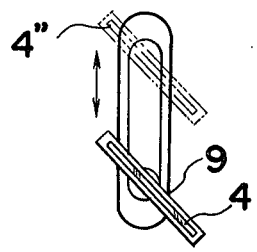

Still referring to FIGS. 1 and 2, and also referring to FIG. 3, if it is required to make available the entirety of the area of the film material 1 for photographing a scene, the movable mirror 4 is moved in straight line or pivotal motion to a second position in which it lies across no portion of the light path followed by image-wise light exiting from the taking lens system 5, and in which it may not direct the image of data items onto the film material 1, alternative second positions of the mirror 4 being indicated by the chain-dot line portions 4' and 4" of FIGS. 1 and 2. In FIG. 3(a), the mirror 4 may be fixedly held by a holder 8 which is fixedly mounted on a pivotal shaft 8a and is normally inclined downwardly and rearwardly to hold the mirror 4 is the first position, but which upon actuation of an external means not shown is pivoted anticlockwise as seen in the drawing, i.e., forwardly with respect to the camera, and carries the mirror 4 to the second position. In this case, when the mirror 4 is in the second position, it is disposed generally horizontally and the image of data items directed downwardly by the fixed mirror 3 cannot impinge thereon. Alternatively, as shown in FIG. 3(b), the mirror 4 may be fixedly held by a frame 9 which may be caused to moved along a slot 9a upwards or downwards in sliding motion by a known external actuation means. In this case, when the frame 9 is in a lowermost position the mirror 4 is held in the first position, and when the frame 9 is in an uppermost position the mirror 4, although still parallel to the fixed mirror 3 and able to receive the image of data items, is at the second position, and directs the image of data items to a portion of the camera interior which is clear of the film material 1 or onto a portion of the film material 1 which does not carry image information subsequently appearing on a completed print. Means for causing requisite movement of the mirror 4 to and from the first and second positions may be for example a solenoid assembly which causes rotation of the shaft 8a in response to actuation of an externally actuable switch, or an externally actuable position-selection means which is mechanically connected to and can cause movement of the frame 9.

Figure 8:
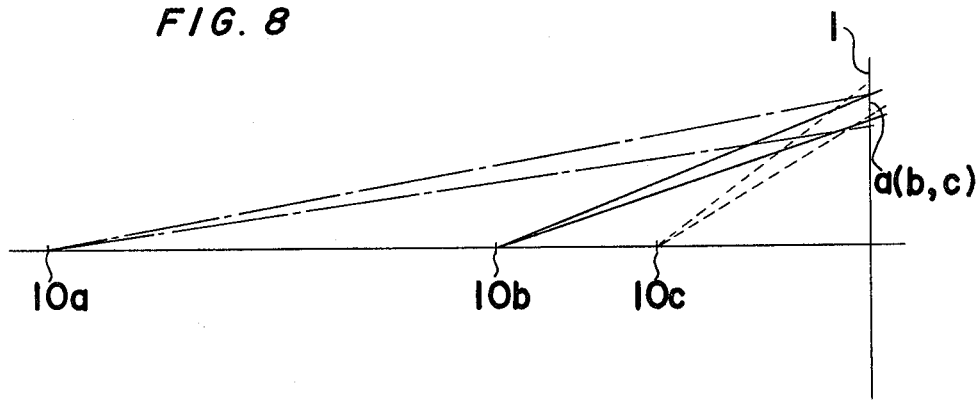
FIG. 8 is an explanatory drawing illustrating principles of selection of the position of a blocking element employed in the means of the invention.

Referring to FIG. 8, the first position of the movable mirror 4 is suitably located close to the plane of the film material 1 and is located at the convergence of the path followed by light rays travelling from the centre of the exit pupil 10a of a telescopic lens towards the data recording area, a similar path extending from the centre of the exit pupil 10b of a standard lens 10b, and a similar path extending from the centre of the exit pupil 10c of a wide angle lens, with which the camera may be fitted. Such location of the first position of the movable mirror 4 has the advangtage that no special adjustment of the data-record background-defining means is necessary when lens change is effected. The size and shape of the mirror 4 are such that the mirror 4 causes to be defined on the film material 1 a background which extends at least over the area covered by recorded data items when the diaphragm 6 is set to the minimum aperature.

It is not essential that the movable mirror 4 be a full-reflection mirror, but the mirror 4 may also be constituted as a semi-transparent mirror which is coated with aluminium or zinc sulfide. In this case also the data-record background in a completed print is dark and close to black, and data items are suitably recorded in white. Alternatively, the mirror 4 may be constituted as a multiple-layer interference film element which is transparent to only to light of one colour and is reflective only of light of the complementary colour. If for example the mirror 4 is transparent to yellow light, the mirror 4 is made reflective of red or blue light, and in this case there is produced in the data recording area of a completed print a yellow background and data items which are recorded in red or blue and are therefore clearly legible. There may also be employed as the mirror 4 coloured glass material which is rendered semi-transparent and reflective by application thereon of a coat of aluminium or zinc sulfide. In this case, the data-record background is the colur of the coloured galss material and data items are suitably recorded in white. Alternatively, the same effect my be achieved by employing semi-transparent material and a colour filter attached or positioned close thereto, or a dark background for data items may be produced by employment of an ND filter in association with semi-transparent material.

Referring now to FIGS. 4 and 5, according to another embodiment of the invention the data projection system is constituted by the light source 2a, the focussing lens 2b, the fixed mirror 3, and another fixed mirror 12, onto which the image of data items at the data projection station is directed by the mirror 3 and which directs the image onto the data recording area of the film material 1. If for example the data recorded consists of three data items, a, b, and c indicative of the year, month and day, the blocking element is constituted by an element 11 consisting of three circular elements 11a, 11b, and 11c which are connected to one another by bar elements and are supported by a common base portion 11d, and which, when the blocking element 11 is in a first position, indicated by the dashed line portion 11 of FIG. 5, lie in the path F of light which travels from the centre of the exit pupil 7 of the taking lens system 5 and each of which prevents arrival of this light on a portion of the data recording area which is required for recording of a data item a, b, or c. In this embodiment the blocking element 11 is held in the first position only when a photographer determines by viewal through the viewfinder of the camera that the scene he or she wishes to photograph is too bright for data items to be clearly distinguishable on a completed print. In other situations, i.e., when it is judged that the portion of a photographed scene is dark enough to constitute a sufficiently contrasting background to recorded data items, the blocking element 11 is moved to a second position not shown in which it no longer blocks any light exiting from the taking lens system 5. The elements 11a, 11b, and 11c may of course be completely opaque or be semi-transparent, or, if the data projection system is such that it projects light of only one colour onto the data recording area, may be transparent only to light of a colour which is complementary to the colour of the light which is directed by the data projection system onto the data recording area, such a quality of the elements 11 being achieved in the manner described in reference to FIGS. 1 through 4.

Referring now to FIG. 6, to effect required movement of the blocking element 11 the base portion 11d thereof may be pivotally mounted on a fixed shaft 13, be loaded by a spring means which when unopposed holds the blocking element in the first position, indicated by the chain-dot line portion of FIG. 6, and define an outer end extension which is always contacted by a rod 14 which is fixedly attached to an externally actuable slide switch element 15. When the slide switch element 15 is moved to a rightmost position as seen in the drawing the spring means is unopposed to move the blocking element 11 to the first position, and when the slide switch element 15 is moved to a leftmost position the rod 14 causes the blocking element to pivot anticlockwise as seen in the drawing to the second position 11'. If it is sometimes required not to record data and to make the entire area of the film material 1 available for recording the image of a scene, there may be provided a switch 16 which controls the actuation circuit of the light source 2a, which when actuated permits the light source 2a to be actuated momentarily during actuation of the camera shutter means, and which is actuated by the blocking element base portion 11d when the blocking element 11 is in the first position, but is unactuated when the blocking element 11 is in the second position. Alternatively, of course, the switch 16 may be actuable by an independent switch provided on the exterior of the camera or by the slide switch element 15.

Figure 7:
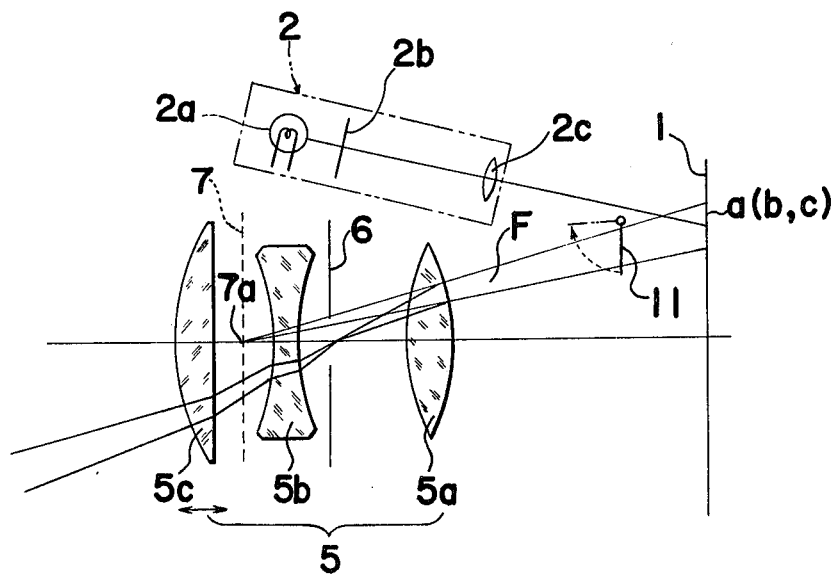
FIG. 7 is a front-to-rear cross-sectional view of a data-record background-defining means according to a 3rd embodiment of the invention.

Referring to FIG. 7, if the data specification block 2 is inclined downwardly and rearwardly in a disposition such that the data recording area lies on the optical axis of the focussing lens 2c, a simpler construction is achieved since the fixed mirror 3 and associated mirror 4 or 12, may be dispensed with. In this case, the background defining means is suitably constituted by the blocking element 11.

Althrough the present invention has been fully described by way of examples with reference to the accompanying drawings, it is to be noted that various changes and modifications are apparent to those skilled in the art. Therefore, unless such changes and modifications depart from the scope of the present invention, they should be construed as included therein.

What is claimed is:

1. In a data-recording camera including a taking lens system for exposure of film material located at an exposure station to image-wise light reflected from an external scene, data specification means, and a data projection system for projection of data items at a data projection station onto a data recording area of said film material, the improvement wherein: said data projection system is independent of said taking lens system and said camera includes a data background-defining means comprising at least one blocking element and means for mounting said blocking element for movement into and out of the path of image-wise light of said taking lens system reflected from said external scene and at all times outside of the path of said data image light of said data projection system and means for shifting said blocking element from one position to the other for preventing passage of at least a portion of said external scene light rays to said data recording area of said film material; whereby, picture taking can be more freely achieved due to unrestricted optical positioning of the blocking element independent of data-record, and wherein data may be recorded on said data recording area of said film material with or without the employment of the blocking element to shield that area of said film material from light emanating from the external scene.

2. The camera as claimed in claim 1, wherein said means for shifting said blocking element comprises an external actuable blocking element positioning means for causing said blocking element to be moved to a first position wherein said blocking element lies across said light path extending from the center of an exit pupil of said taking lens system towards said data recording area and to a second position wherein said blocking element is external to the path of all light emanating from said taking lens system.

3. The camera as claimed in claim 2, wherein said data projection system includes a light source actuable to illuminate data items at said data projection station and which includes a control switch which is turned on and renders said light source actuable when said blocking element is in said first position and which is turned off and renders said light source unactuable when said blocking element is at said second position.

4. The camera as claimed in claim 1, wherein there is provided a plurality of said blocking elements, which are generally circular, are connected to one another, and are equal in number to the number of separate data items recordable on said data recording area, and each of which may at least partially block arrival of said image-wise light reflected from said external scene on a portion of said data recording area at least equal in size to the portion of said area required for recording of the corresponding said data item.

5. The camera as claimed in claim 1, wherein said blocking element constitutes an opaque member which completely blocks said image-wise light travelling along said path extending from the center of the exit pupil of said taking lens system towards said data recording area.

6. The camera as claimed in claim 1, wherein said blocking element comprises a semi-transparent mirror element which permits passage therethough of a portion of said image-wise light reflected from said external scene and travelling along said light path.

7. The camera as claimed in claim 6 wherein said semi-transparent mirror element comprises a transparent material coated with one material of the group consisting of aluminum and zinc sulfide.

8. The camera as claimed in claim 6, wherein said semi-transparent mirror element comprises a transparent material which has received surface treatment which imparts to said mirror element a multi-layer interference film construction and renders said mirror element transparent to electromagnetic radiation of a wavelength corresponding to light of a certain color and reflective of electromagnetic radiation of a wavelength corresponding to light of a color which is complementary to the color of the light to which said mirror element is transparent.

9. The camera as claimed in claim 6, wherein said semi-transparent mirror element comprises a colored glass coated with one material of the group consisting of aluminium and zinc sulfide.

10. The camera as claimed in claim 6, wherein said blocking element comprises a semi-transparent mirror element comprising a transparent material coated with one material of the group consisting of aluminium and zinc sulfide, and wherein said blocking element further comprises a color filter.

* * * * *